J. M. Myers,
Harness,
No. 67,566.  Patented Aug. 6, 1867.
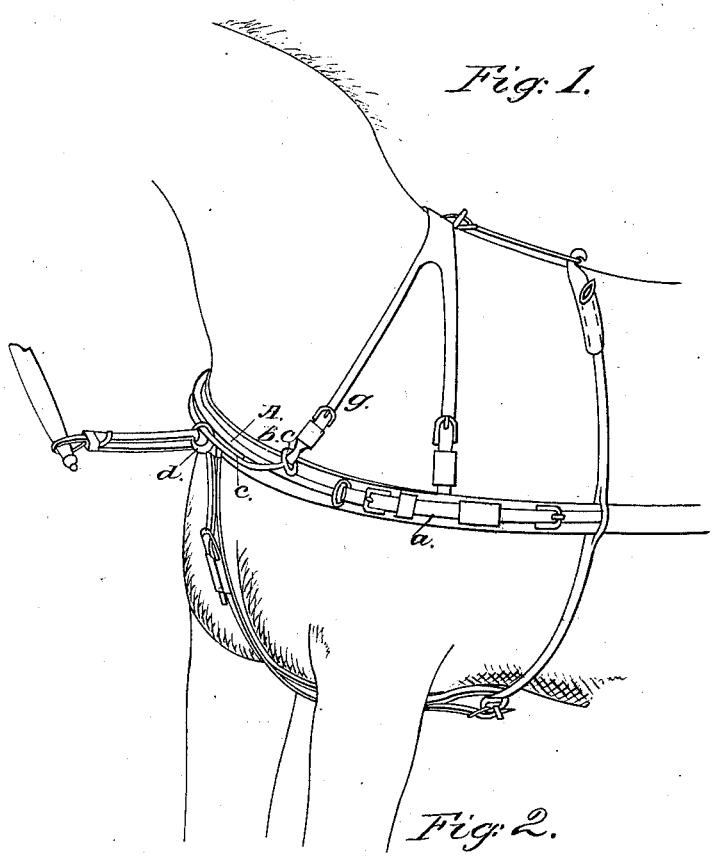
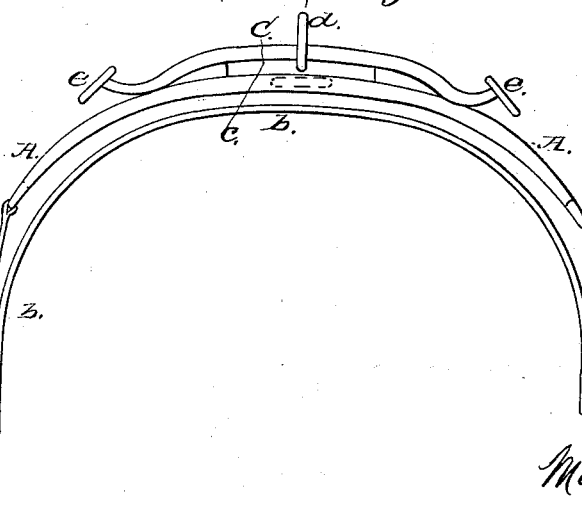

United States Patent Office.

JOHN M. MYERS, OF LOUISVILLE, KENTUCKY.

*Letters Patent No. 67,566, dated August 6, 1867.*

IMPROVED BREAST-COLLAR AND SPREADER FOR DOUBLE HARNESS.

*The Schedule referred to in these Letters Patent and making part of the same.*

TO ALL WHOM IT MAY CONCERN:

Be it known that I, JOHN M. MYERS, of Louisville, in the county of Jefferson, and State of Kentucky, have invented an improved Breast-Collar and Spreader for Double Harness; and I do hereby declare that the following is a full, clear, and exact description thereof, reference being had to the accompanying drawings, making a part of this specification, in which—

Figure 1 is a view showing the manner in which the breast-plate is applied to one of a pair of horses.

Figure 2 is a top view of the breast-collar and spreader.

Similar letters of reference indicate corresponding parts in the two figures.

This invention relates to a novel improvement on the breast-collar for double harness, for which Letters Patent were granted to Samuel E. Stowell on the ninth day of December, 1865. This breast-collar claimed by Stowell is applied in front of the main strap, and it consists of a metal bar, bent in a suitable manner, and supported by neck-straps and the breast-straps, so as to stand out in front of the horse, and receives all the lateral strain. This spreader or collar is a great improvement on the common breast-strap, as it relieves the horse considerably of unnatural strain, and to some extent prevents the animal from galling.

The object of my invention and improvement is to apply to the spreader two offsets or loops, in such manner that when the spreader is applied to a horse it will be equally balanced, and the straps which hold it up will not be liable to chafe the horse's neck, as will be hereinafter explained.

Another object of my invention is to attach a ring to the front part of the spreader in such manner that it shall have a free lateral play for several inches, said ring being designed for receiving the pole-strap and allowing the horse more freedom of motion, while it prevents cramping or pulling of the spreader or collar to one side, as will be hereinafter explained.

To enable others skilled in the art to understand my invention, I will describe its construction and operation.

In the accompanying drawings, A represents a metal bar, which is bent or bowed in such manner that when applied to the breast of a horse it will extend around in front of the same, and stand out from the breast-strap, as shown in fig. 2. The ends of this bent bar or collar A terminate in elliptical loops for receiving the straps $a$, as described in the Stowell patent, which straps attach the spreader to the breast-collar $b$. To the front edge of the bow or collar A a bar or rod, C, is rigidly secured on each side of the middle of the length of said collar, so as to leave an oblong slot of say six inches in length, as shown in fig. 2, at $c$. This slot allows a ring or loop, $d$, to be applied on the bar C, so that this ring will play freely in a lateral direction. The extremities of the bar C are turned upward and inward, and terminate in elliptical loops or eyes, $e\ e$, which are at equal distances from the middle of the length of the collar A and slot $c$. By firmly securing a loop or eye beneath the collar A, in the middle of its length, for receiving the martingale-strap, the collar is finished and ready for application to a horse.

The drawing, fig. 1, shows how the collar is applied to a horse. The neck-straps $g$ are brought down and attached to the two eyes $e\ e$, which prevent these straps from contact with the neck near the breast of the horse, and consequently prevent any rubbing or galling of the neck, as is the case with the spreader patented to Stowell, above referred to, in which the neck-straps are attached to a loop in front of the breast of the horse and at the middle of the length of the collar. This improvement of mine not only prevents galling of the horse's neck, but it allows the collar to be suspended and held up equally on both sides of the breast of a horse, so as to be equally balanced.

The method described of attaching the pole-strap to the collar differs from that of Stowell, in that the ring or loop $d$ has a free, lateral play of several inches, which gives the animal greater freedom of motion at the front part of the pole, and does not cramp or pull the collar to one side.

Having described my invention, what I claim as new, and desire to secure by Letters Patent, is—

1. The construction and arrangement of the looped arms $e\ e$ upon the collar A, for receiving the neck-straps, as herein described.

2. The attachment of the pole-strap loop $d$, so that it is allowed to have a free lateral play on the bar C, substantially as described.

JOHN M. MYERS.

Witnesses:
L. STRAUS,
D. J. DINGMAN.